United States Patent Office 3,753,944
Patented Aug. 21, 1973

3,753,944
WATER-SOLUBLE HOT MELT ADHESIVE
Julius Sirota, South Plainfield, and Gerald T. Gargiulo, Piscataway, N.J., assignors to National Starch and Chemical Corporation, New York, N.Y.
No Drawing. Filed June 16, 1971, Ser. No. 153,823
Int. Cl. C08g 51/34
U.S. Cl. 260—33.2 R                           6 Claims

ABSTRACT OF THE DISCLOSURE

A water-soluble hot melt adhesive is disclosed suitable for use as a pick-up or tail tie adhesive for wound paper webs, said adhesive comprising a poly(ethylene oxide) of molecular weight 15,000 to 50,000, a water-soluble poly(alkylene oxide) or derivatives thereof of molecular weight 190 to 15,000 and optionally, inert fillers and dyes.

BACKGROUND OF THE INVENTION

This invention relates to hot melt adhesives and more particularly to improved, water-soluble hot melt adhesives suitable for pick-up and tail tying in the manufacture of wound paper web products.

In manufacturing a product comprising a paper web wound on a core, such as a roll of paper towels, it is necessary to adhere the web to the core at the beginning of the winding process to prevent the web from slipping on the core. This process is known in the industry as "pick-up" and an adhesive suitable for such use is known as a "pick-up adhesive."

Similarly, it is desirable to adhere the last ply of the wound web to the ply underneath to prevent unwinding during handling, stacking, packing, or other operations which subject the wound roll to some mechanical stress. This process is known as tail tying. Tail tie adhesives must have enough wet tack to hold when applied, yet allow the outer flap or tail (and successive plies) to release from the roll without tearing. The adhesive should also be water soluble (or at least water dispersible) for easy clean-up and repulping, should that be necessary. If possible, the adhesive should be non-staining so that it is nearly invisible. Pick-up adhesives must have properties similar to those of tail tie adhesives except that they must have a higher degree of tack than the minimum required of tail tie adhesives.

Water based adhesives have been used for some time as tail tie adhesives. It has been found, however, that the tack of water based adhesives is insufficient to hold the outer flap on many of the paper towel stocks used, especially at the higher winding speeds that are now common. The best water based adhesives have only marginally sufficient wet tack on these towel stocks while still giving non-tearing bonds when the adhesive has dried.

A class of adhesive compositions known as hot melt adhesives has enjoyed continuously increasing usage in industrial applications. These hot melt adhesives are solid or semi-solid combinations of film forming resins, tackifying resins, rubbery polymers plasticizers, waxes, and similar materials which may be added to the composition in order to impart various properties thereto. Adhesive bonds derived from hot melts are particularly useful because of their tackiness in the molten state and their ultimate highly flexible nature.

Although hot melt adhesives have occasionally been used as tail tie adhesives they have hitherto been for the most part unsuitable for pick-up and tail tying because they have not been water soluble and hence would leave residues which interfere with repulping of scrap paper.

SUMMARY OF THE INVENTION

Accordingly, it is an object of this invention to provide water soluble hot melt adhesive compositions. A further object is to provide such adhesive compositions having variable degrees of tack suitable for both pick-up and tail tying applications. A further object is to provide a 100 percent solids adhesive having sufficient tack to hold the tail of the paper web when it is being wound while allowing the tail to release without tearing the paper when the product is used.

The water-soluble hot melt adhesives of this invention are compositions comprising a blend of
(a) A poly(ethylene oxide) having a molecular weight between about 15,000 and 50,000;
(b) A water-soluble poly(alkylene oxide) having a molecular weight between about 190 and about 15,000; and
(c) Optionally, fillers and colorants such as clays, dyes and pigments.

Generally the compositions will contain 90 to 30 percent by weight of component (a), 10 to 70 percent by weight of component (b), and up to 10 percent by weight of component (c), the percentages being chosen so that the sum of the percentages of the individual components equals 100.

DESCRIPTION OF THE PREFERRED EMBODIMENTS

The poly(ethylene oxide) used as component (a) of the composition of this invention should have a molecular weight in the range from about 15,000 to about 50,000. The compounds suitable for use as this basic ingredient of the adhesive are long chain polyethers terminated with a hydroxyl group on each end. They are prepared by condensation of ethylene oxide by well known methods. Polymers of the desired molecular weight are prepared by direct condensation of ethylene oxide until the desired molecular weight is reached, or by coupling shorter chains by means well known in the art. Suitable poly(ethylene oxides) are available commercially, such as the Carbowax polyethylene glycols sold by Union Carbide Corporation.

Although an adhesive comprising solely the relatively high molecular weight poly(ethylene oxide) of component (a) will allow release of the plies of the stronger kraft paper towels used in commerce and industry without tearing, the relatively weaker towels used in homes will tear before releasing when bonded with this poly(ethylene oxide) alone.

Accordingly, to prepare adhesives suitable for use with household towels or tissues, it is necessary to modify the properties of the poly(ethylene oxide) to provide easier release of the toweling. It has been found that this can be accomplished by mixing the poly(ethylene oxide) with one or more water-soluble poly(alkylene oxides) or derivatives thereof having molecular weights in the range from 190 to no greater than 15,000. Such additives, when incorporated into the adhesive in amounts ranging from 10% to 70% by weight of the composition, modify the properties of the poly(ethylene oxide) so that the adhesive will easily release the paper when the roll of toweling is unwound in use without sacrificing the desirable high molten tack and rapid setting of the adhesive.

Poly(alkylene oxides) useful as constituent (b) of the adhesive include poly(ethylene oxides), derivatives of poly(ethylene oxide) having short hydrocarbon side chains such as poly(propylene oxide), and poly(ethylene oxide) having one or both of the terminal hydrogen atoms substituted by a small hydrocarbon group such as the methyl or phenyl ethers of poly(ethylene oxide).

3

Such compounds are prepared by the same general methods as the poly(ethylene oxides) of constituent (a) using well known procedures. Many are available commercially.

The colorants and fillers useful as component (c) of this invention comprise pigments such as titanium dioxide, aluminum silicate, and calcium carbonate, and water soluble dyes. They may be incorporated in amounts up to 10% by weight of the adhesive composition to provide desirable color or other properties.

In preparing the novel hot melt adhesives of this invention, ordinarily the poly(ethylene oxide) of high molecular weight is placed in a jacketed mixing kettle equipped with rotors and the temperature is raised to 200–250° F. to melt the polymer. The lower molecular weight component is added with mixing, then the optional fillers, colorants, etc., are added. Stirring and heating are continued until a smooth, homogeneous mass is obtained. The resulting hot melt adhesive composition is drawn off and may be used immediately in hot pots, or it may be molten-extruded into rope form or converted into pellets, rods, cylinders, slugs, or billets depending upon the equipment which will be subsequently used to apply the hot melt; or it may be placed in cooling pans and held in bulk for later use; or it may be granulated or diced.

Other methods of preparation may be used and variations introduced according to the knowledge of those skilled in the art without departing from the spirit of this invention, provided only that the result be a uniform mixture of the proper ingredients.

In general those adhesives according to this invention which use a relatively large amount of high molecular weight poly(ethylene oxide) have a high strength and high molten tack and are suitable for tail tying of paper towel stock. Those adhesives which have relatively less of the high molecular weight component are lower in molten tack and strength and are more suitable for tail tying with tissue paper.

The adhesives of this invention may be applied with conventional hot melt adhesive applicators. The adhesives are most conveniently applied at viscosities of from 1000 to 4000 centipoises which are attained at temperatures of 350 to 200° F.

The adhesives are best applied through nozzles via an extrusion system which applies the adhesive to the outside ply or the next inner ply on the rolls. The adhesives may also be applied by hot bars, blades, and other means. The length of the adhesive bead may vary from a spot to a line several inches long. The higher tack adhesives need only the shorter lines to hold the tails properly. The adhesive bead thickness controls the tightness of the bond, i.e., the thicker the adhesive bead, the tighter the bond between the plies. Best results are obtained with an adhesive bead no more than 0.030 inch thick.

The paper towel and tissue pick-up adhesives have essentially the same requirements as the tail tie adhesives as regards ease of release and water solubility. Generally, however, they must have a higher degree of tack than that required of tail tie adhesives. Pick-up adhesives are usually applied by wheels or rollers to the cores.

The following examples will illustrate the practice of this invention but are not intended to limit its scope. In these examples all parts are by weight unless otherwise specified.

4

EXAMPLE I

This example shows the preparation and testing of a series of hot melt tail tie adhesives.

A series of hot melt tail tie adhesives comprising a poly(ethylene oxide) of molecular weight 15,000–20,000 and a phenyl ether of a polyethylene glycol of molecular weight 314 corresponding to the compositions listed in Table I were prepared by the following procedure. The poly(ethylene oxide) was melted in a vessel and heated to 250° F. The phenyl ether of polyethylene glycol was added with mixing and the mixture was blended to give a homogeneous, smooth adhesive. The molten uniform adhesive was then tested for molten tack, setting speed, and release characteristics from paper toweling by the following procedures.

Setting speed was tested by applying a 0.0015 inch thick film of the molten adhesive to a sheet of bond paper, using a heated Bird applicator. The tack of the applied film was tested by finger pressure, and the time until it was no longer tacky was recorded. In this test the fastest setting adhesives were judged excellent.

Molten tack was tested by applying parallel strips of two different formulations side by side on bond paper. The tackiness of each sample was evaluated by finger pressure and the tackier adhesive judged superior. By comparing one formulation with another all the adhesives prepared were ranked for relative tackiness. The highest ranking adhesives were judged excellent.

Release characteristics of the adhesives were evaluated by applying to a 1" x 5" strip of household paper toweling a 0.010 inch thick strip of adhesive ⅛" wide by 4" long. The strip was applied using a 0.01 inch thick plastic film template and a doctor blade. The template was removed and a second strip of toweling was pressed lightly onto the adhesive strip. When the adhesive had cooled and set, the towel strips were pulled apart by hand, and the ease of release was noted. Those adhesives having the easiest release in this test were judged excellent; those which held the paper so tightly that it tore rather than release were judged poor.

The compositions of the adhesives and the results of the tests are summarized in Table I. It can be seen that Formulas 2, 3 and 4 show useful properties, with Formula 3 giving the optimum combination of properties.

EXAMPLE II

This example shows the preparation of hot melt tail tie adhesives comprising a relatively high molecular weight poly(ethylene oxide) and a relatively low molecular weight poly(ethylene oxide).

Four series of hot melt tail tie adhesives were prepared and tested as in Example I, each series having as one component the poly(ethylene oxide) of Example I and as its second component a relatively low molecular weight poly(ethylene oxide). The molecular weights of the low molecular weight poly(ethylene oxides) were 190–210, 285–315, 380–420, and 570–630 respectively. In each series the test results were essentially the same as in Example I.

EXAMPLE III

This example shows the preparation of hot melt tail tie adhesives comprising a relatively high molecular weight poly(ethylene oxide) and a relatively low molecular weight methyl substituted poly(ethylene oxide).

TABLE I

| Formulation | 1 | 2 | 3 | 4 | 5 |
|---|---|---|---|---|---|
| Poly(ethylene oxide) 15,000–20,000 M.W. (parts) | 100.0 | 90.0 | 70.0 | 60.0 | 50.0 |
| Phenyl ether of polyethylene glycol (parts) | | 10.0 | 30.0 | 40.0 | 50.0 |
| Molten tack | | Excellent | Excellent | Good | Fair | Poor |
| Setting speed | Excellent | Good | Good | Fair | Poor |
| Release from toweling | V. good | Good | do | Good | Good |
|  | Tears—poor | Fair | Excellent | Excellent | Excellent |

Three series of hot melt tail tie adhesives were prepared and tested as in Example I, each series having as one component the poly(ethylene oxide) of Example I and as its second component a relatively low molecular weight methoxy poly(ethylene oxide). The molecular weights of the low molecular weight methoxy poly(ethylene oxides) for each series were 335–365, 525–575, and 715–785 respectively. In each series the results of the tests were essentially the same as in Example I.

EXAMPLE IV

This example shows the preparation of hot melt tail tie adhesives comprising a relatively high molecular weight poly(ethylene oxide) and one of several poly(ethylene oxides) of somewhat lower molecular weight.

A series of hot melt tail tie adhesives was prepared and tested as in Example I comprising as one component the poly(ethylene oxide) of Example I and as the other component a poly(ethylene oxide) of molecular weight 950–1050. The compositions of the adhesives and the results of the tests are summarized in Table II. It can be seen that Formulas 2, 3 and 4 are compositions having useful properties, with Formula 3 giving the best balance of properties.

The preparation and testing were repeated using as the second component of the mixture a number of different molecular weight poly(ethylene oxides). Three more series of adhesives were prepared and tested using poly(ethylene oxides) of somewhat lower molecular weight. 3700, and 6000–7500, respectively. The results of the tests of these adhesives were essentially the same as those of the tests of the first series of this example.

molecular weight 950–1050. The compositions of the adhesives and the results of the tests are summarized in Table III. It can be seen that Formulas 2, 3 and 4 are composition having useful properties with Formula 3 giving the best balance of properties.

The preparation and testing was repeated using as the second component of the mixture a number of poly(ethylene oxides) having different molecular weights. Three more series of adhesives were prepared and tested using poly(ethylene oxides) of molecular weight 1300–1600, 3000–3700, and 6000–7500 respectively. The results of the test of each of these series were essentially the same as those of the first series of this example.

TABLE III

| Formulation | 1 | 2 | 3 | 4 |
|---|---|---|---|---|
| Poly(ethylene oxide) 40,000–50,000 M.W. (parts) | 70.0 | 50.0 | 40.0 | 30.0 |
| Poly(ethylene oxide) 950–1050 M.W. (parts) | 30.0 | 50.0 | 60.0 | 70.0 |
| Molten tack | Excellent | V. good | Fair-good | Fair-poor. |
| Setting speed | V. good | Excellent | Excellent | Excellent. |
| Release from toweling | Poor-fair | Good | V. good-excellent | Do. |

EXAMPLE VI

This example shows the preparation of hot melt tail tie adhesives comprising a relatively high molecular weight poly(ethylene oxide) and a polyalkylene glycol.

A series of hot melt tail tie adhesives was prepared and tested as in Example I comprising as one component the poly(ethylene oxide) of Example I and as the second component a polyalkylene glycol having a viscosity at 100° F. of 90,000 Saybolt seconds, and a molecular weight of less than 15,000. Test results are summarized in Table IV. It can be seen from this table that Formulas 2, 3 and 4 are suitable for tail tie adhesives, with Formula 3 giving the best balance of properties.

TABLE IV

| Formulation | 1 | 2 | 3 | 4 | 5 |
|---|---|---|---|---|---|
| Poly(ethylene oxide) 15,000–20,000 M.W. (parts) | 90.0 | 80.0 | 60.0 | 40.0 | 30.0. |
| Polyalkylene glycol (parts) | 10.0 | 20.0 | 40.0 | 60.0 | 70.0. |
| Molten tack | Excellent | Excellent | Excellent | V. good | Good. |
| Setting speed | do | do | V. good | Good | Fair-poor. |
| Release from toweling | Tears—Poor | Fair | Excellent | Excellent | Excellent. |

EXAMPLE VII

This example shows the preparation of hot melt tail tie adhesives comprising a relatively high molecular weight poly(ethylene oxide), a poly(ethylene oxide) of somewhat lower molecular weight, a polyalkylene glycol.

A series of hot melt tail tie adhesives was prepared and tested as in Example I comprising the poly(ethylene oxide) of Example I, a poly(ethylene oxide) having a

TABLE II

| Formulation | 1 | 2 | 3 | 4 | 5 |
|---|---|---|---|---|---|
| Poly(ethylene oxide) 15,000–20,000 M.W. (parts) | 80.0 | 70.0 | 50.0 | 40.0 | 30.0. |
| Poly(ethylene oxide) 950–1,050 M.W. (parts) | 20.0 | 30.0 | 50.0 | 60.0 | 70.0. |
| Molten tack | V. good | V. good | Good | Fair | Poor. |
| Setting speed | do | do | Excellent | Excellent | Excellent. |
| Release from toweling | Tears—poor | Fair | V. good-excellent | do | Do. |

EXAMPLE V

This example shows the preparation of hot melt tail tie adhesives comprising a poly(ethylene oxide) of molecular weight 40,000–50,000 and several poly(ethylene oxides) of lower molecular weight.

A series of hot melt tail tie adhesives was prepared and tested as in Example I comprising as one component a poly(ethylene oxide) of molecular weight 40,000–50,000 and as the other component a poly(ethylene oxide) of molecular weight of 950–1050, and a polyalkylene glycol having a viscosity at 100° F. of 90,000 Saybolt seconds and a molecular weight of less than 15,000. The compositions of the adhesives and the results of the test are summarized in Table V. It can be seen that Formulas 2, 3, 4, 6 and 7 are compositions having useful adhesive properties, with Formulas 3 and 7 giving the best balance of properties.

TABLE V

| Formulation | 1 | 2 | 3 | 4 | 5 | 6 | 7 | 8 |
|---|---|---|---|---|---|---|---|---|
| Poly(ethylene oxide) 15,000–20,000 M.W. (parts) | 80.0 | 70.0 | 55.0 | 40.0 | 30.0 | 70.0 | 40.0 | 30.0 |
| Poly(ethylene oxide) 950–1,050 M.W. (parts) | 10.0 | 10.0 | 10.0 | 10.0 | 10.0 | 10.0 | 20.0 | 30.0 |
| Polyalkylene glycol (parts) | 10.0 | 20.0 | 35.0 | 50.0 | 60.0 | 20.0 | 40.0 | 40.0 |
| Molten tack | Excellent | Excellent | V. good | Good | Fair-poor | Excellent | Good | Poor. |
| Setting speed | do | do | Excellent | Excellent | Excellent | do | Excellent | Excellent. |
| Release from toweling | Tears—poor | Fair | do | do | do | do | Fair | do | Do. |

The preparation and testing was repeated using as the second component of the mixture a number of different molecular weight poly(ethylene oxides). Three more series of adhesives were prepared using poly(ethylene oxides) of molecular weights 1300, 3000–3700, and 6000–7500, respectively. The results of the tests of these adhesives were essentially the same as those of the tests of the first series of this example.

EXAMPLE VIII

This example shows the preparation of hot melt tail tie adhesives having properties suitable for use on tissue paper rolls.

A series of hot melt tail tie adhesives were prepared and tested as described in Example I using the compositions listed in Table VI. The adhesives were thereafter tested as in Example I except that the release characteristics tests were done with tissue paper instead of toweling. The results of the tests are tabulated in Table VI. It can be seen that Formulas 2, 3, 5 and 6 show properties suitable for tissue tail tie adhesives.

TABLE VI

| Formulation | 1 | 2 | 3 | 4 | 5 | 6 | 7 |
|---|---|---|---|---|---|---|---|
| Poly(ethylene oxide) 15,000–20,000 M.W. (parts) | 30.0 | 30.0 | 30.0 | 30.0 | 40.0 | 50.0 | 60.0 |
| Phenyl ether of polyethylene glycol (parts) | 70.0 | 40.0 | 25.0 | | 20.0 | 15.0 | 10.0 |
| Poly(ethylene oxide) 950–1,050 M.W. (parts) | | 30.0 | 45.0 | 70.0 | 40.0 | 35.0 | 30.0 |
| Staining of tissue | Poor | Fair | Fair | Excellent | Fair | Good | V. good |
| Molten tack and setting speed | do | Good | V. good | do | V. good | V. good | Excellent |
| Release from tissues | Excellent | Excellent | do | Tears—poor | do | Fair | Tears—poor |

Three other series of adhesive compositions were prepared using poly(ethylene oxides) of molecular weight 1300–1600, 3000–3700, and 6000–7500 in place of the polyethylene oxide of molecular weight 950–1050. When tested, these adhesives all showed essentially the same properties as the corresponding compositions of Table VI.

Likewise four series of adhesives were prepared and tested in which poly(ethylene oxides) of molecular weights 190–210, 285–315, 380–420, and 570–630, respectively, were substituted for the phenyl ether of polyethylene glycol in the compositions of Table VI. In each case the properties of the adhesives were essentially the same as those of the corresponding members of Table VI.

EXAMPLE IX

This example shows the preparation of hot melt tail tie adhesives incorporating pigment and dye additives.

A series of hot melt tail tie adhesives was prepared as in Example I using the compositions of Table V. In each case, however, 10.0 parts of titanium dioxide or calcium carbonate, or 2.0 parts of a dye were added to the adhesive. When tested, the adhesives which contained the additives showed essentially the same properties as the corresponding member of Table V.

Summarizing, this invention provides a water soluble, hot melt adhesive having properties suitable for use as a tail tie adhesive for wound paper products.

Variations in materials, proportions, and procedures will be evident to experienced practitioners without departing from the scope of this invention, which is defined by the following claims.

What is claimed is:

1. A water-soluble hot melt adhesive composition comprising a blend of
   (a) from about 90 percent to about 30 percent, by weight, of a poly(ethylene oxide) having a molecular weight between 15,000 and about 50,000 and
   (b) from about 10 percent to about 70 percent, by weight, of at least one water-soluble poly(alkylene oxide) or derivative thereof selected from the group consisting of
      (1) poly(ethylene oxide) having a molecular weight between 190 and 7,500 and methyl and phenyl ethers thereof and
      (2) a polyalkylene glycol having a viscosity at 100° F. of 90,000 Saybolt seconds and a molecular weight less than 15,000.

2. The composition of claim 1 wherein component (a) is a poly(ethylene oxide) having a molecular weight between 15,000 and about 20,000.

3. The composition of claim 1 containing additionally (c) a filler or colorant.

4. The composition of claim 3 wherein component (c) is present in a quantity of up to 10 percent by weight.

5. The composition of claim 3 wherein said colorant is a pigment.

6. The composition of claim 3 wherein said colorant is a dye.

References Cited
UNITED STATES PATENTS

| | | | |
|---|---|---|---|
| 3,025,255 | 3/1962 | Lambuth | 260—33.2 RX |
| 2,917,470 | 12/1959 | Bressler et al. | 260—2 A |
| 3,154,514 | 10/1964 | Kelly | 260—2 AX |

LEWIS T. JACOBS, Primary Examiner

U.S. Cl. X.R.

260—37 R